US012610005B2

(12) United States Patent (10) Patent No.: US 12,610,005 B2

Cai (45) Date of Patent: Apr. 21, 2026

(54) CIRCUIT BOARD COMPONENT AND ELECTRONIC DEVICE

(71) Applicant: VIVO MOBILE COMMUNICATION CO., LTD., Dongguan (CN)

(72) Inventor: Yongfa Cai, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 323 days.

(21) Appl. No.: 18/244,889

(22) Filed: Sep. 11, 2023

(65) Prior Publication Data

US 2023/0421681 A1 Dec. 28, 2023

Related U.S. Application Data

(63) Continuation of application No. PCT/CN2022/079892, filed on Mar. 9, 2022.

(30) Foreign Application Priority Data

Mar. 11, 2021 (CN) .......................... 202110266154.5

(51) Int. Cl.
H04M 1/02 (2006.01)

(52) U.S. Cl.
CPC ................................ H04M 1/0277 (2013.01)

(58) Field of Classification Search
CPC ...... H04M 1/0277; H04M 1/026; H05K 1/14; H05K 1/148; H05K 1/147; Y02E 60/10
See application file for complete search history.

(56) References Cited

U.S. PATENT DOCUMENTS

| 7,654,829 B1 | 2/2010 | Chuang et al. |
| 9,578,759 B2 | 2/2017 | Seo et al. |
| (Continued) | | |

FOREIGN PATENT DOCUMENTS

| CN | 107482332 A | 12/2017 |
| CN | 207117788 U | 3/2018 |
| (Continued) | | |

OTHER PUBLICATIONS

Extended European Search Report issued in related European Application No. 22766320.0, mailed Aug. 9, 2024, 8 pages.

(Continued)

*Primary Examiner* — Angelica Perez
(74) *Attorney, Agent, or Firm* — IPX PLLC

(57) ABSTRACT

A circuit board component and an electronic device are provided. The circuit board component includes: a main control board, a first flexible printed circuit, a first bracket, a second bracket, a second flexible printed circuit, and a fastener. At least a part of the first flexible printed circuit is disposed on the main control board. The first bracket is located on a side of the first flexible printed circuit away from the main control board, and the first bracket is connected to the main control board. At least a part of the second bracket is located between the first flexible printed circuit and the first bracket. The second bracket abuts against the first bracket. The second bracket is connected to the first flexible printed circuit. A part of the second flexible printed circuit is located between the first bracket and the second bracket.

14 Claims, 17 Drawing Sheets

(56)        References Cited

U.S. PATENT DOCUMENTS

2015/0062844 A1 *   3/2015   Bae ..................... H04M 1/0249
                                                    361/752
2016/0198560 A1 *   7/2016   Shin .................... G02B 6/0011
                                                    361/749
2020/0310072 A1 *  10/2020   Hubert .................. G02B 7/021

FOREIGN PATENT DOCUMENTS

CN        112421321  A      2/2021
CN        113055511  A      6/2021
EP         3624570  A1      3/2020

OTHER PUBLICATIONS

International Search Report issued in corresponding International
Application No. PCT/CN2022/079892, mailed May 30, 2022, 4
pages.
First Office Action issued in related Chinese Application No.
202110266154.5, mailed Nov. 30, 2022, 3 pages.

* cited by examiner

CIRCUIT BOARD COMPONENT AND ELECTRONIC DEVICE

CROSS-REFERENCE TO RELATED APPLICATIONS

This application is a continuation of International Application No. PCT/CN2022/079892, filed on Mar. 9, 2022, which claims priority to Chinese Patent Application No. 202110266154.5 on Mar. 11, 2021. The entire contents of each of the above-referenced applications are expressly incorporated herein by reference.

TECHNICAL FIELD

This application relates to the field of terminal technologies, and in particular to a circuit board component and an electronic device.

BACKGROUND

Currently, mobile phone designs have entered an era of 5G. To implement photo shooting in multiple scenes using a wide-angle mode, a portrait mode, a landscape mode and achieve a design for high-power fast charging, an ultra-thin body for comfortable grip, and ultimate appearance, in a Printed Circuit Board (PCB1 layout, designers often encounter a problem that a space between holes is insufficient. Therefore, a Board To Board (BTB) connector cannot be arranged in a transverse direction.

As shown in FIG. 1 to FIG. 5, in the related art, when layout space is insufficient in a transverse direction, in a case that a requirement for the appearance is prioritized, one Flexible Printed Circuit (FPC) has to directly cross another BTB connector in the layout. In addition, if a separate BTB fastening bracket 70' is designed to press a primary FPC-BTB 30', both an assembly process and a disassembly method are complicated, and there are problems, for example, excessive screws are used and an area utilization rate of a motherboard is low.

SUMMARY

Embodiments of this application are intended to provide a circuit board component and an electronic device.

This application is implemented as follows.

According to a first aspect, an embodiment of this application provides a circuit board component, including:

a main control board;

a first flexible printed circuit, where at least a part of the first flexible printed circuit is disposed on the main control board;

a first bracket, where the first bracket is located on a side of the first flexible printed circuit away from the main control board, and the first bracket is connected to the main control board;

a second bracket, where at least a part of the second bracket is located between the first flexible printed circuit and the first bracket, the second bracket abuts against the first bracket, and the second bracket is connected to the first flexible printed circuit;

a second flexible printed circuit, where a part of the second flexible printed circuit is located between the first bracket and the second bracket; and a fastener, where the first bracket is connected to the main control board by using the fastener.

According to a second aspect, an embodiment of this application further provides an electronic device, including the circuit board component according to the embodiment of the first aspect.

In the embodiments of this application, a second bracket is disposed between a first flexible printed circuit and a first bracket, and it is unnecessary to dispose a fastener such as an additional screw to fasten the second bracket. This avoids a motherboard bracket and a PCB need to be fastened while a separate connector bracket needs to be designed to press a BTB connector, and at least two additional screws need to be disposed to fasten the BTB connector bracket, thereby causing complicated disassembly and low installation efficiency. In the embodiments of this application, the fastener only needs to be used to connect the first bracket to the main control board by using the fastener, so that by stacking the FPCs, wiring on the second flexible printed circuit is implemented, and the second flexible printed circuit is pressed and fastened to the main control board or the BTB connector, thereby effectively saving the fasteners, improving a space utilization rate of the circuit board component, and further improving installation efficiency.

BRIEF DESCRIPTION OF DRAWINGS

To describe the technical solutions in embodiments of this application more clearly, the following briefly describes the accompanying drawings required in the embodiments of this application. Apparently, the accompanying drawings in the following descriptions show merely some embodiments of this application, and a person of ordinary skill in the art may still derive other drawings from these accompanying drawings without creative efforts.

DETAILED DESCRIPTION

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the description and the claims of this application are used to distinguish between similar objects, and do not need to be used to describe a specific order or sequence. It should be understood that, data termed in such a way is interchangeable in proper circumstances, so that the embodiments of this application can be implemented in an order other than the order illustrated or described herein.

A circuit board component provided in the embodiments of this application is mainly used for electronic devices, including but not limited to electronic devices such as mobile phones, tablet computers, laptop computers, mobile computers, and handheld game consoles. The electronic device may be used in devices other than the electronic devices.

The following further describes a circuit board component 100 and an electronic device proposed in the embodiments of this application with reference to the accompanying drawings.

Figure 1:
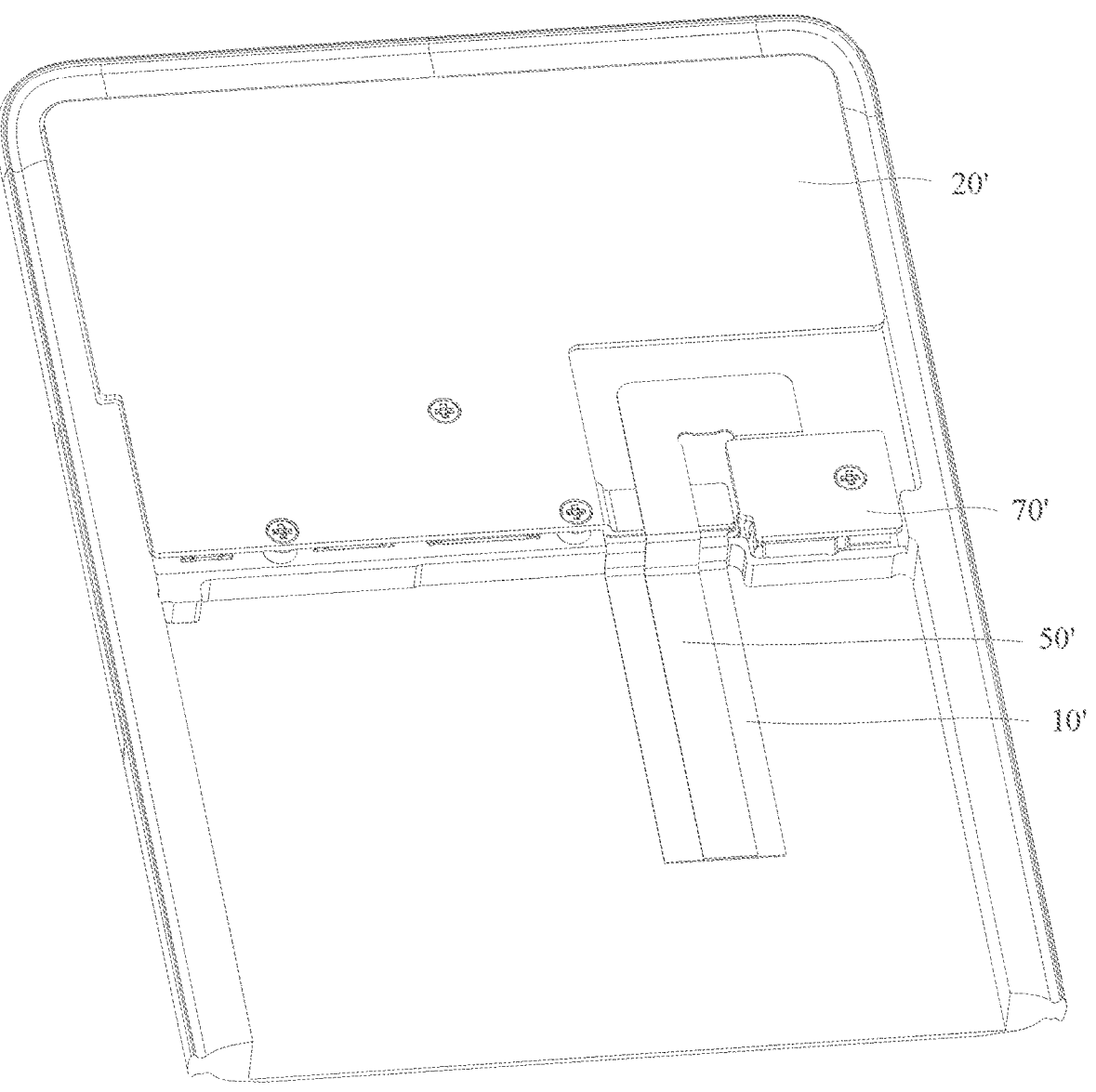
FIG. 1 is a first schematic diagram of assembly of an FPC depicting a wiring method in the related art.
Figure 2:
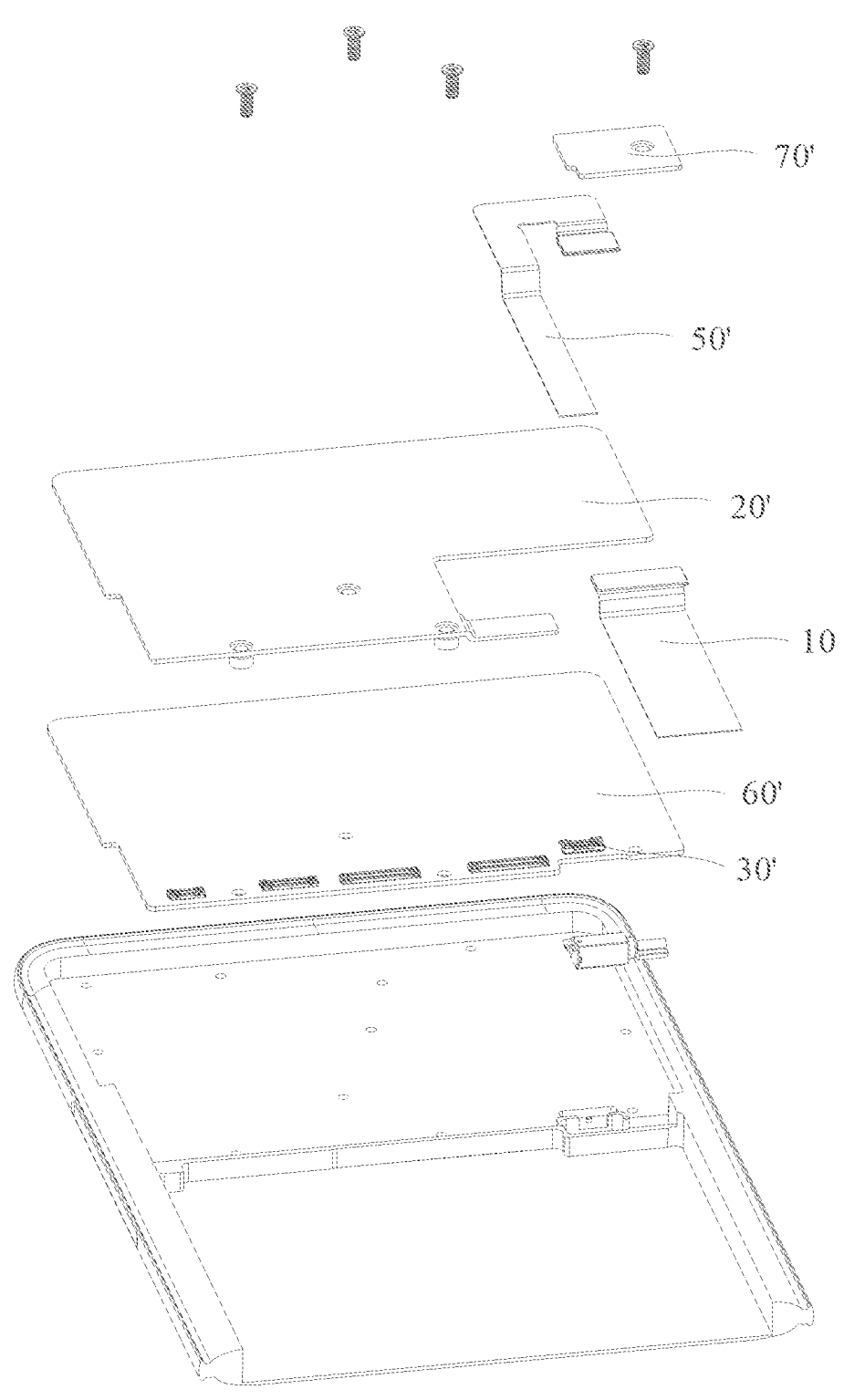
FIG. 2 is an exploded diagram of assembly of an FPC depicting a wiring method in the related art.
Figure 3:
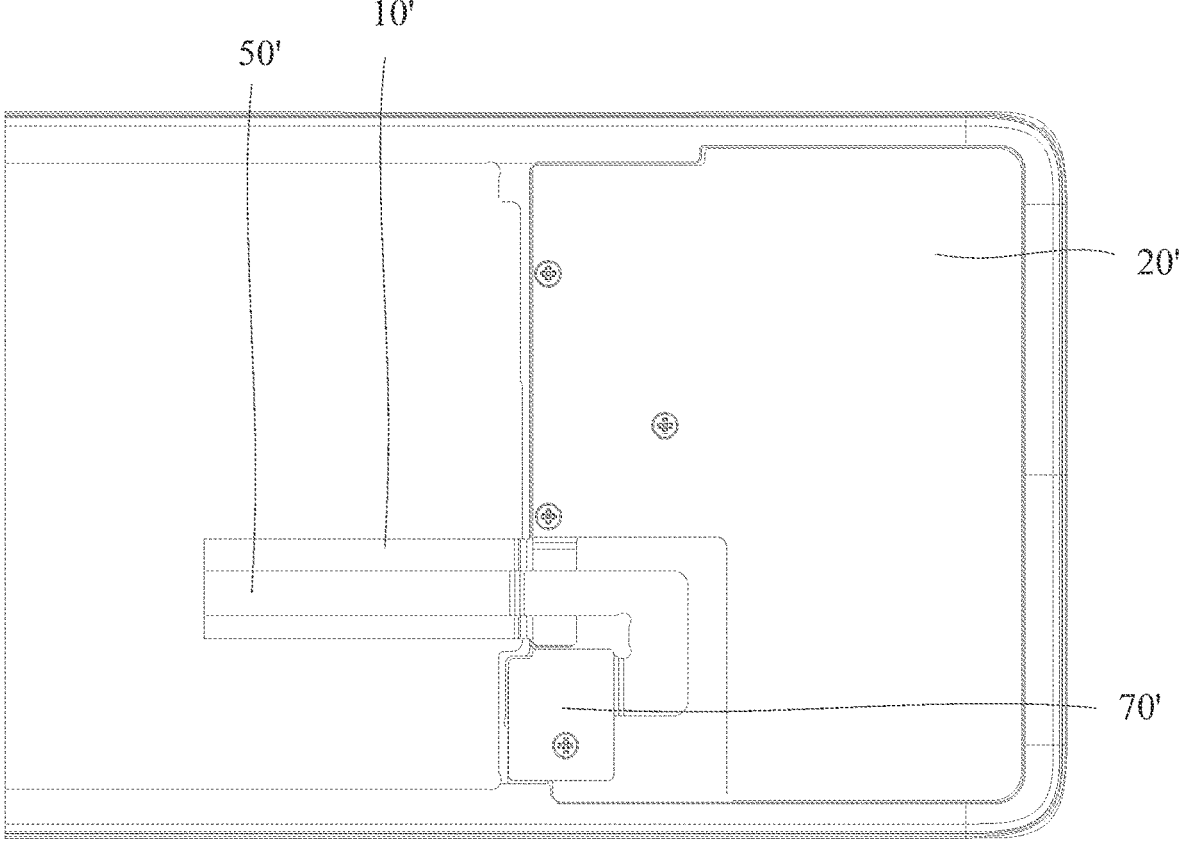
FIG. 3 is a second schematic diagram of assembly of an FPC depicting a wiring method in the related art.
Figure 4:
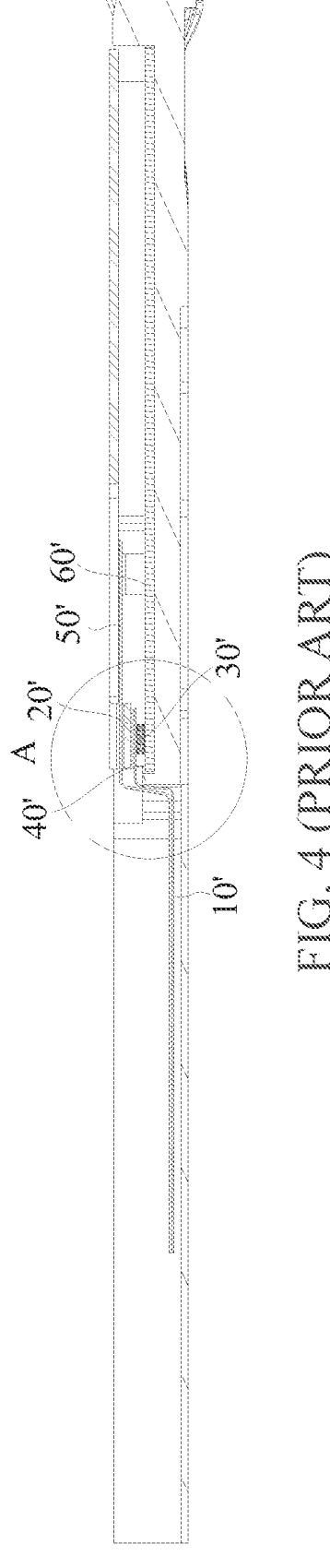
FIG. 4 is a third schematic diagram of assembly of an FPC depicting a wiring method in the related art.
Figure 5:
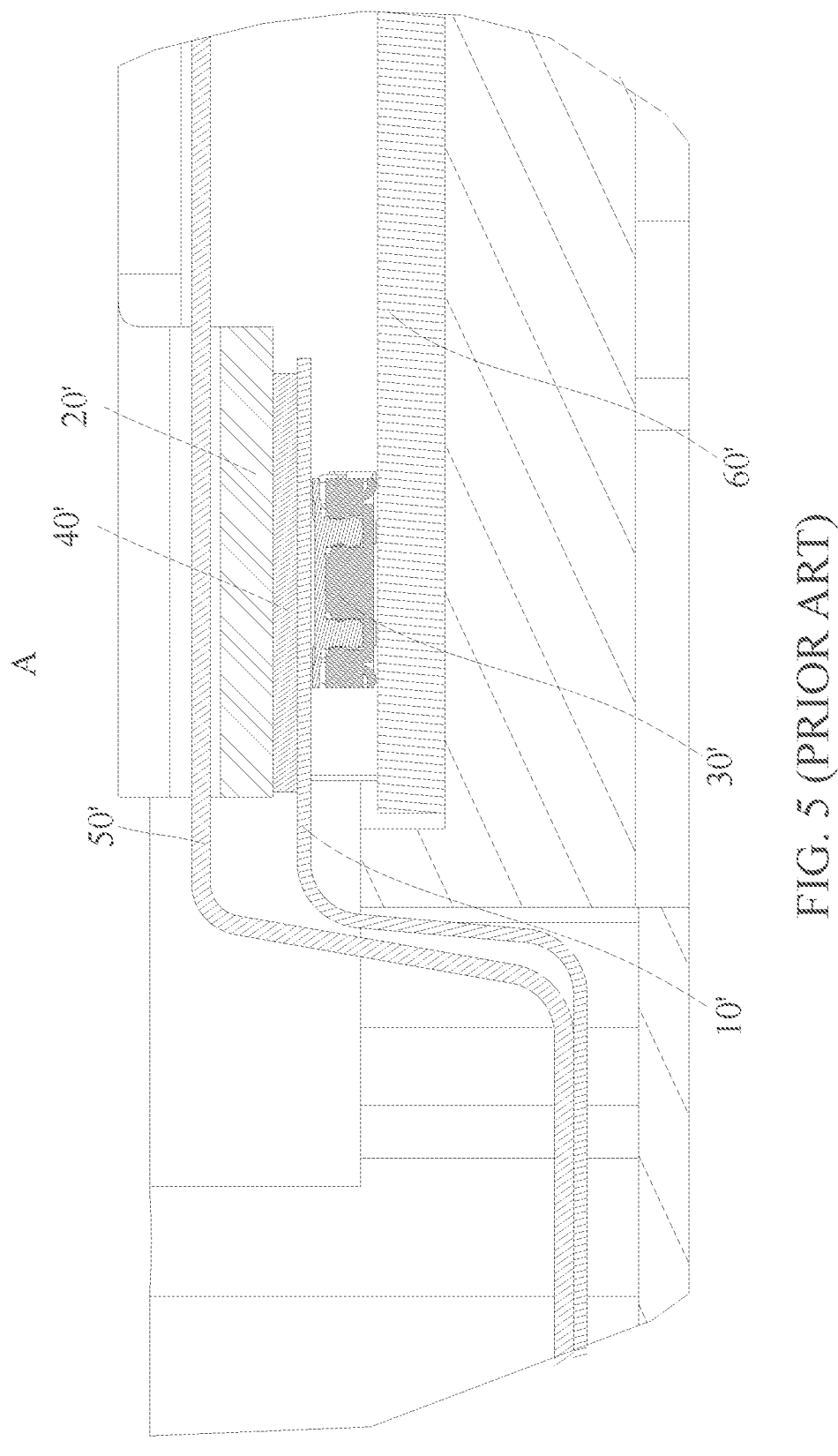
FIG. 5 is a partial view of assembly of an FPC depicting a wiring method in FIG. 4 enlarged at A.

FIG. 1 is a first schematic diagram of assembly of an FPC depicting a wiring method in the related art. FIG. 2 is an exploded diagram of assembly of an FPC depicting a wiring method in the related art. FIG. 3 is a second schematic diagram of assembly of an FPC depicting a wiring method in the related art. FIG. 4 is a third schematic diagram of assembly of an FPC depicting a wiring method in the related art. FIG. 5 is a partial view of assembly of an FPC depicting a wiring method in FIG. 4 enlarged at A.

As shown in FIG. 1 to FIG. 5, in the related art, when layout space is insufficient in a transverse direction, in a case that a requirement for the appearance is prioritized, one FPC has to directly cross another BTB connector in the layout. A primary FPC 10' is directly buckled onto a primary FPC-BTB 30'. A motherboard bracket 20' directly presses a primary FPC-BTB reinforced steel plate 40' to prevent the primary FPC-BTB 30' from loosening. A secondary FPC 50' passes over the motherboard bracket 20'. During an assembly process, the motherboard PCBA 60' must be installed first. Next, the primary FPC 10' is assembled. Then, the motherboard bracket 20' is assembled. After that, the secondary FPC 50' is assembled. Finally, the BTB fastening bracket 70' is assembled. Therefore, for the secondary FPC 50', one separate BTB fastening bracket 70' must be designed and locked by using screws to ensure that the primary FPC-BTB 30' does not loosen. However, if one separate BTB fastening bracket 70' is designed to press the primary FPC-BTB 30', both an assembly process and a disassembly method are complicated. In addition, to ensure that the BTB fastening bracket 70' can reliably press the primary FPC-BTB 30', usually two screws are needed to lock the BTB fastening bracket 70', or one screw and a patch clamping hook are used to fasten the BTB fastening bracket 70'. Therefore, for example, excessive screws are used, and an area utilization rate of a motherboard is low.

Figure 6:
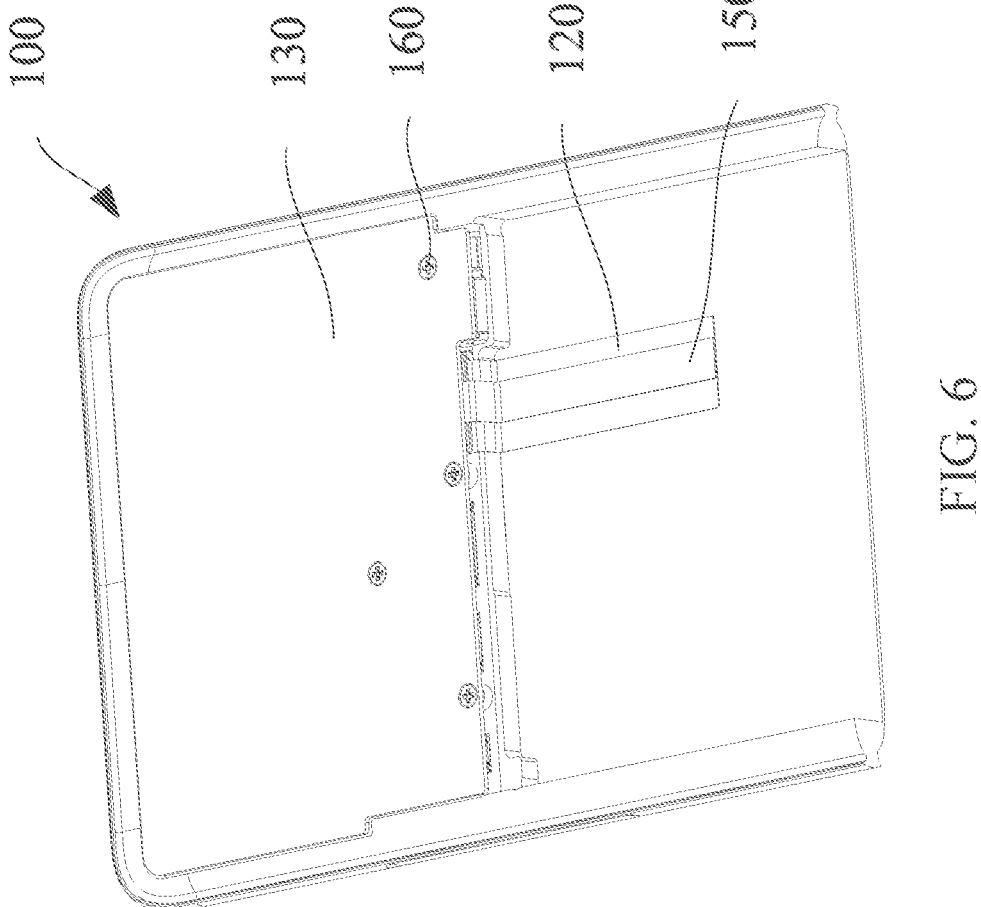
FIG. 6 is a first structural diagram of a circuit board component according to an embodiment of this application.
Figure 7:
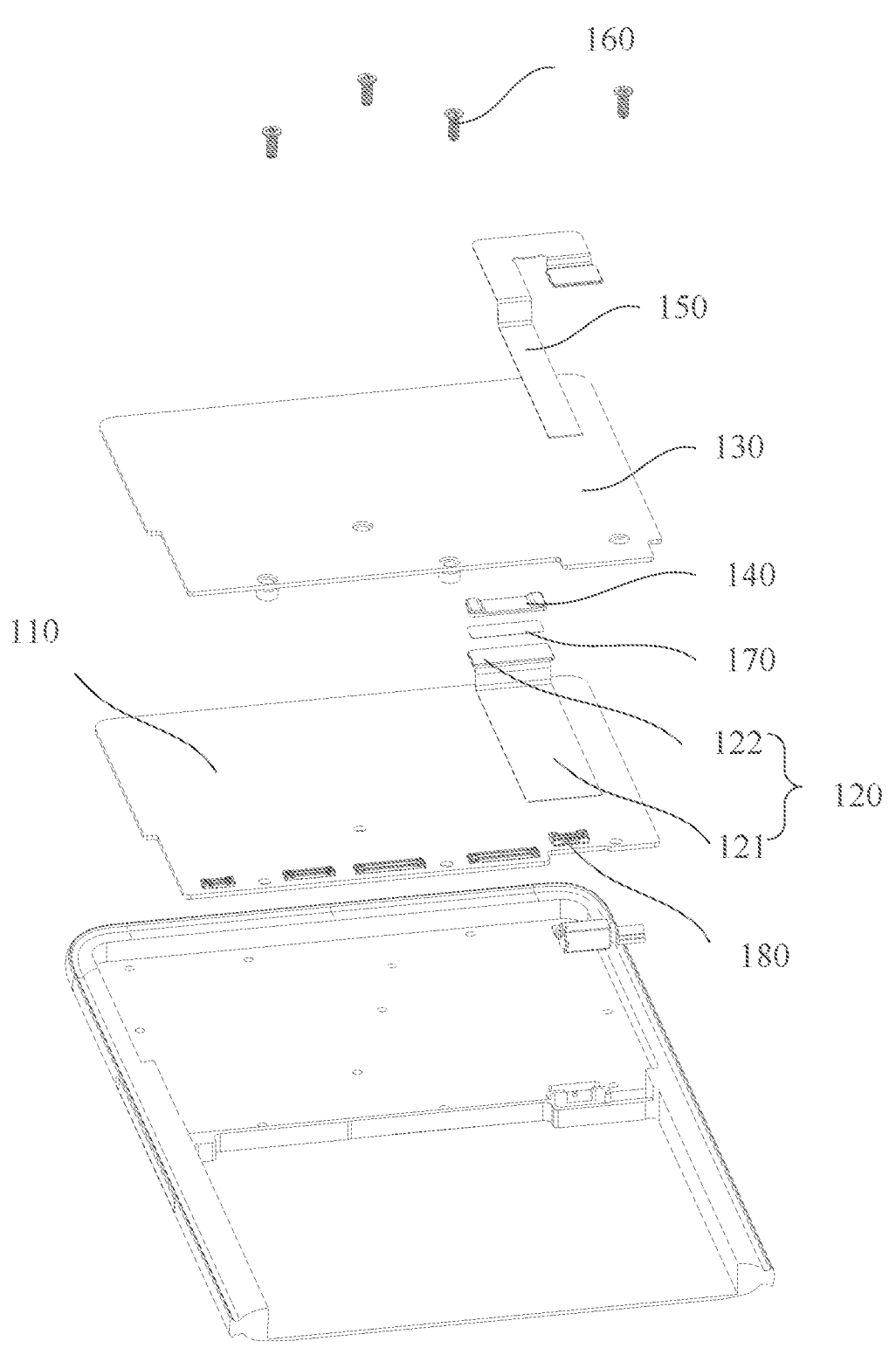
FIG. 7 is an exploded diagram of a circuit board component according to an embodiment of this application.
Figure 8:
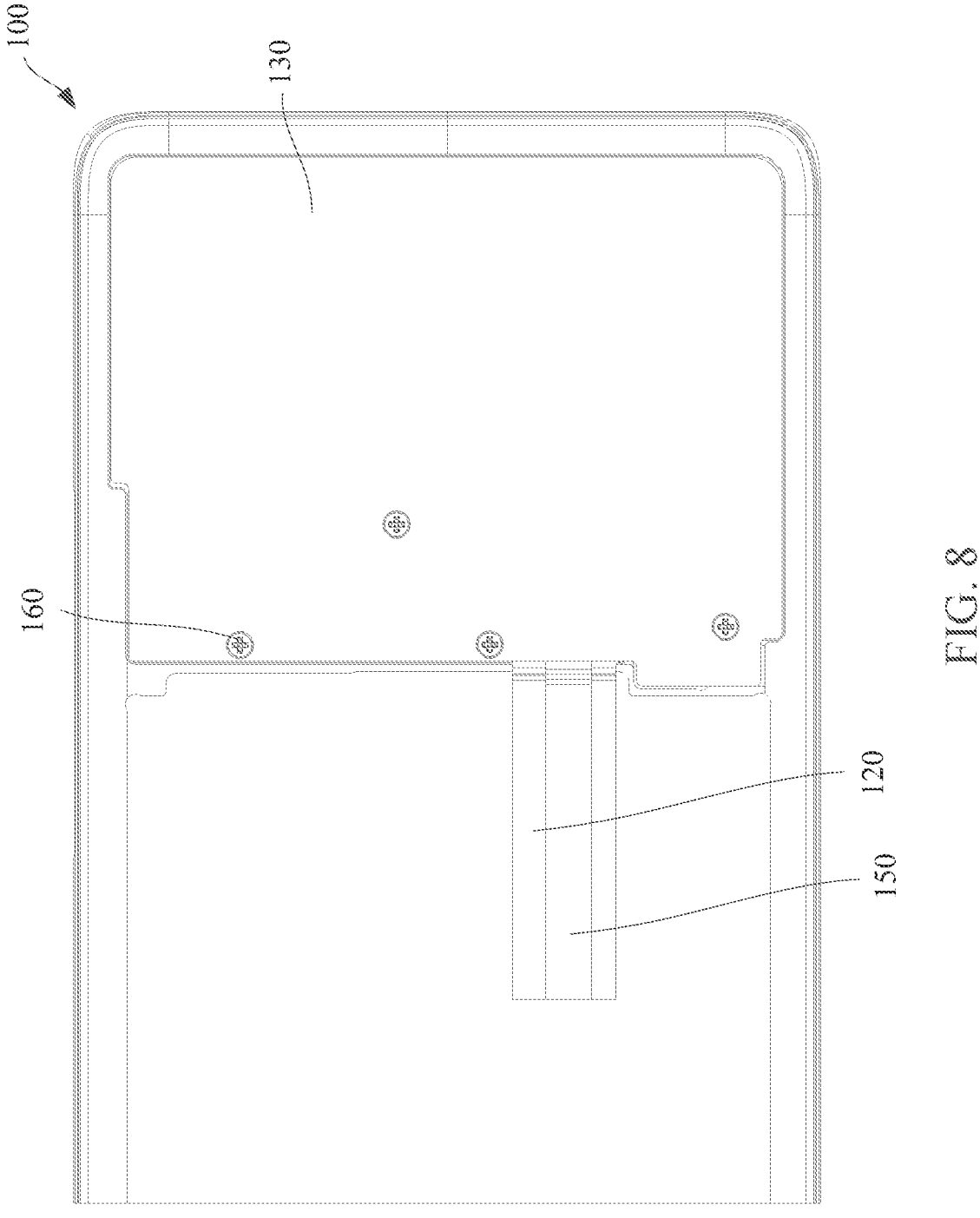
FIG. 8 is a second structural diagram of a circuit board component according to an embodiment of this application.
Figures 9, 10:
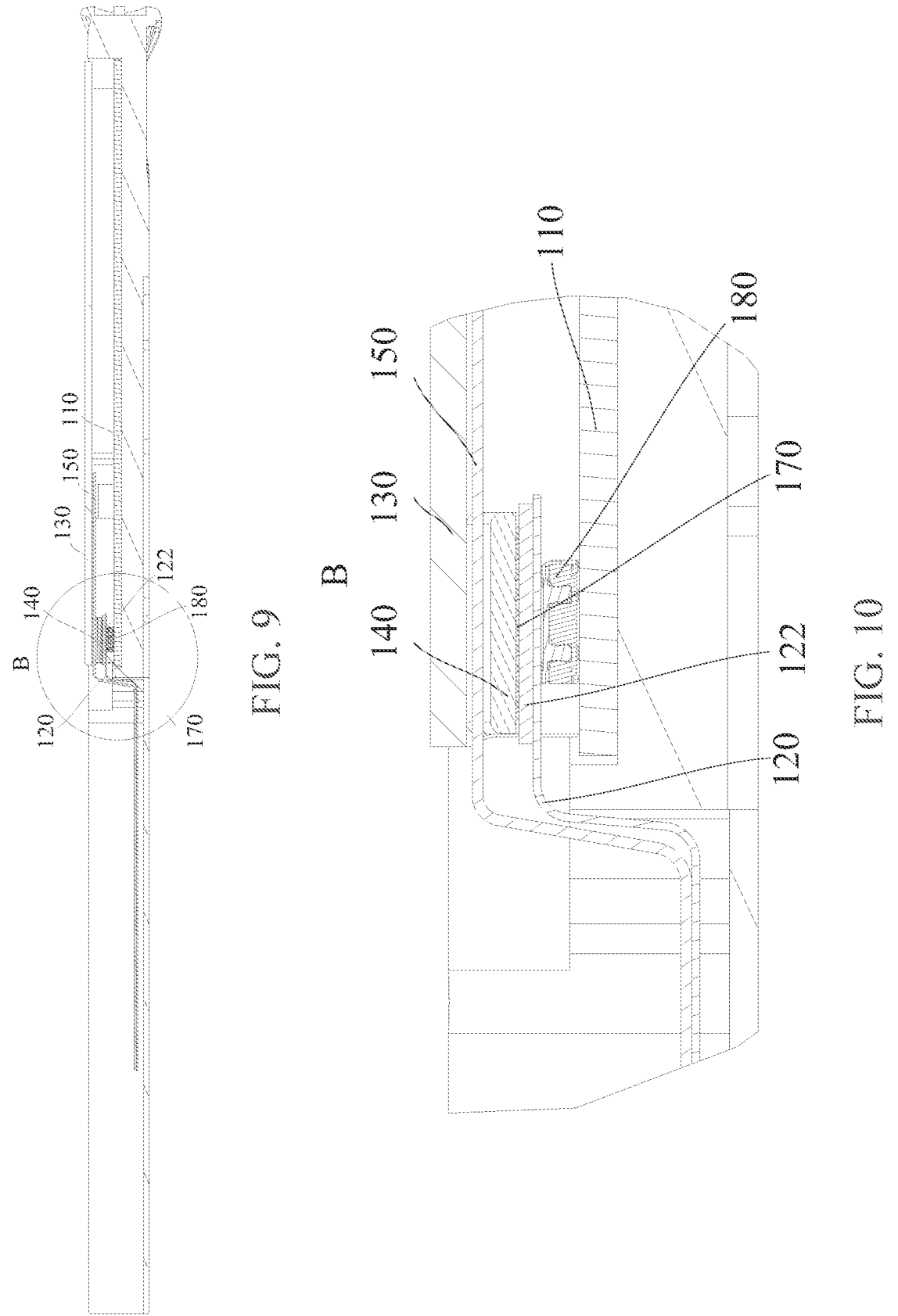
FIG. 9 is a third structural diagram of a circuit board component according to an embodiment of this application.
FIG. 10 is a partial view of the circuit board component shown in the embodiment in FIG. 9 enlarged at B.

FIG. 6 is a first structural diagram of a circuit board component 100 according to an embodiment of this application. FIG. 7 is an exploded diagram of a circuit board component 100 according to an embodiment of this application. FIG. 8 is a second structural diagram of a circuit board component 100 according to an embodiment of this application. FIG. 9 is a third structural diagram of a circuit board component 100 according to an embodiment of this application. FIG. 10 is a partial view of the circuit board component 100 shown in the embodiment in FIG. 9 enlarged at B.

As shown in FIG. 6, FIG. 7, FIG. 8, FIG. 9, and FIG. 10, the embodiments of this application propose a circuit board component 100. The circuit board component 100 includes: a main control board 110; a first flexible printed circuit 120; a first bracket 130; a second bracket 140; a second flexible printed circuit 150; and a fastener 160. At least a part of the first flexible printed circuit 120 is disposed on the main control board 110. The first bracket 130 is located on a side of the first flexible printed circuit 120 away from the main control board 110, and the first bracket 130 is connected to the main control board 110. At least a part of the second bracket 140 is located between the first flexible printed circuit 120 and the first bracket 130, the second bracket 140 abuts against the first bracket 130, and the second bracket 140 is connected to the first flexible printed circuit 120. A part of the second flexible printed circuit 150 is located between the first bracket 130 and the second bracket 140. The first bracket 130 is connected to the main control board 110 by using the fastener 160.

In the embodiments of this application, the circuit board component 100 includes a main control board 110, a first flexible printed circuit 120, a first bracket 130, a second bracket 140, a second flexible printed circuit 150, and a fastener 160. In some embodiments, at least a part of the first flexible printed circuit 120 is disposed on the main control board 110. It may be understood that the first flexible printed circuit 120 is electrically connected to the main control board 110. If a BTB connector is disposed on the main control board 110, the first flexible printed circuit 120 is electrically connected to the main control board 110 by using the BTB connector.

The first bracket 130 is located on a side of the first flexible printed circuit 120 away from the main control board 110, and the second bracket 140 is disposed between the first flexible printed circuit 120 and the first bracket 130. A part of the second flexible printed circuit 150 is located between the first bracket 130 and the second bracket 140. If a BTB connector is installed on the main control board 110, the first flexible printed circuit 120 is directly pressed onto the BTB connector, and the first bracket 130 is connected to the main control board 110 by using the fastener 160. In this way, the BTB connector is pressed and fastened to the first flexible printed circuit 120 and the second flexible board, thereby providing space for a layout of the circuit board component 100.

Further, the second bracket 140 is disposed between the first flexible printed circuit 120 and the first bracket 130, and it is unnecessary to dispose the fastener 160 such as an additional screw to fasten the second bracket 140. This avoids a motherboard bracket and a PCB need to be fastened while a separate connector fastening bracket needs to be designed to press the BTB connector, and at least two additional screws need to be disposed to fasten the BTB connector fastening bracket, thereby causing complicated disassembly and low installation efficiency. In the embodiments of this application, the first bracket 130 only needs to be connected to the main control board 110 by using the fastener 160, so that wiring on the second flexible printed circuit 150 is implemented, and the second flexible printed circuit 150 is pressed and fastened to the main control board 110 or the BTB connector, thereby effectively saving the fasteners 160, improving a space utilization rate of the circuit board component 100, and further improving installation efficiency.

In some embodiments, the fastener 160 may include a screw. The first bracket 130 is connected to the main control board 110 by using the screw, thereby reducing assembly difficulty of the circuit board component 100 and improving assembly efficiency of the circuit board component 100.

In some embodiments, the circuit board component 100 further includes a plurality of connectors 180. The connector 180 is disposed on the main control board 110 and electrically connected to the main control board 110. During assembly of the circuit board component 100, the first flexible printed circuit 120 is first directly pressed onto one connector 180. Then, at least a part of the second bracket 140 is disposed on the first flexible printed circuit 120, and the first bracket 130 is pressed onto the second bracket 140. The second flexible printed circuit 150 is disposed between the first bracket 130 and the second bracket 140. Finally, the first bracket 130 is connected to the main control board 110 by using the fastener 160 to press and fasten the connector 180 to the flexible printed circuit. In addition, it is unnecessary to design a separate connector fastening bracket to fasten the connector 180, thereby effectively simplifying an assembly process of the circuit board component 100 and saving screws. This further effectively improves a space utilization rate of the circuit board component 100.

In some embodiments, the second flexible printed circuit is provided in plurality, and a plurality of the second brackets are in a one-to-one correspondence with the plurality of second flexible printed circuits, so that by stacking the FPCs, wiring on the plurality of second flexible printed circuits is implemented, thereby implementing a multi-functional design of electronic devices such as mobile phones.

In some embodiments, the second bracket 140 includes a second body 141 and a wire passing port. At least a part of the second body abuts against the first bracket, and at least a part of the second body is connected to the first flexible printed circuit. The wire passing port is provided on the second body 141, and the second flexible printed circuit 150 passes through the wire passing port.

In these embodiments, the second bracket 140 includes a second body 141 and a wire passing port. For example, a wire passing port is provided on the second body 141. When the second flexible printed circuit 150 is installed, a part of the second flexible printed circuit 150 can pass through the wire passing port to implement wiring. In this case, at least a part of the second bracket 140 abuts against the first bracket 130, and when the first bracket 130 is fixedly connected to the main control board 110, the second bracket 140, a part of the first flexible printed circuit 120, and a part of the second flexible printed circuit 150 are pressed and fastened to the main control board 110, so that wiring on the flexible printed circuit is implemented while the second flexible printed circuit 150 passes through the wire passing port of the second bracket 140. This can further reduce a thickness of the circuit board component 100 in a Z-axis direction, so that the circuit board component 100 can be applied to electronic devices such as mobile phones, thereby implementing an ultra-thin and refined design of electronic devices such as mobile phones and improving appearance of electronic devices such as mobile phones.

In some embodiments, a quantity of the wire passing ports may be set according to an actual need. One second flexible printed circuit 150 passes through one wire passing port, and a plurality of the wire passing ports can implement wiring on a plurality of the second flexible printed circuits 150, thereby implementing wiring on a plurality of the flexible printed circuits and implementing a multi-functional design of electronic devices such as mobile phones.

Figure 11:
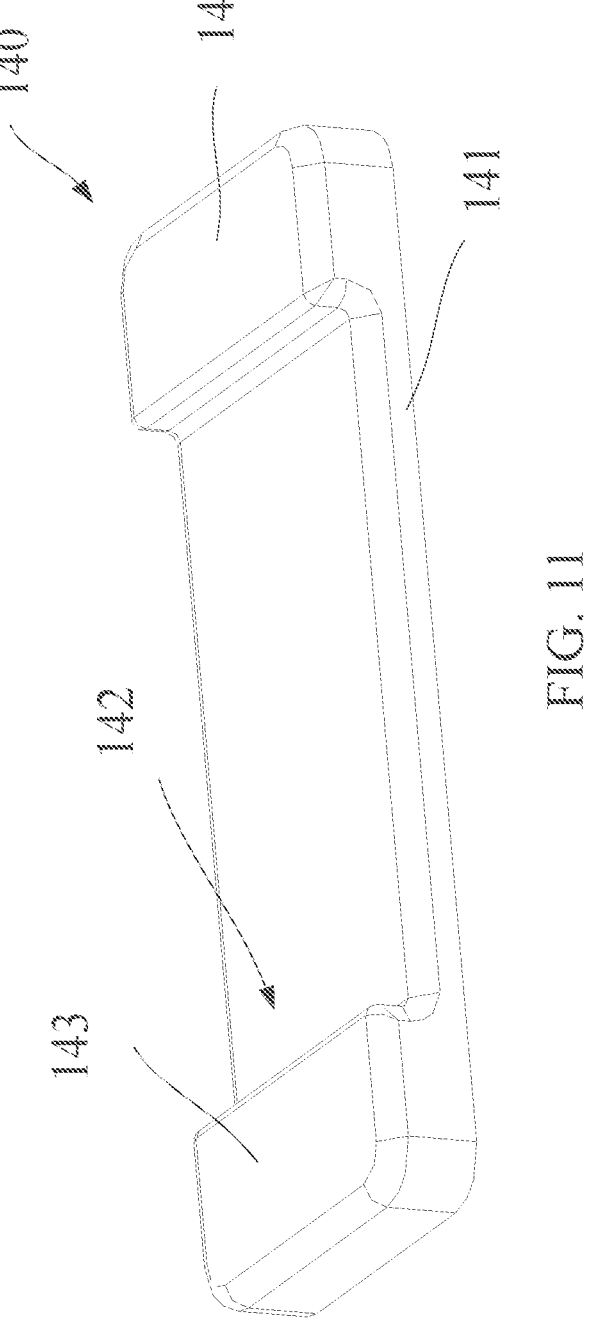
FIG. 11 is a first structural diagram of a second bracket according to an embodiment of this application.
Figure 12:
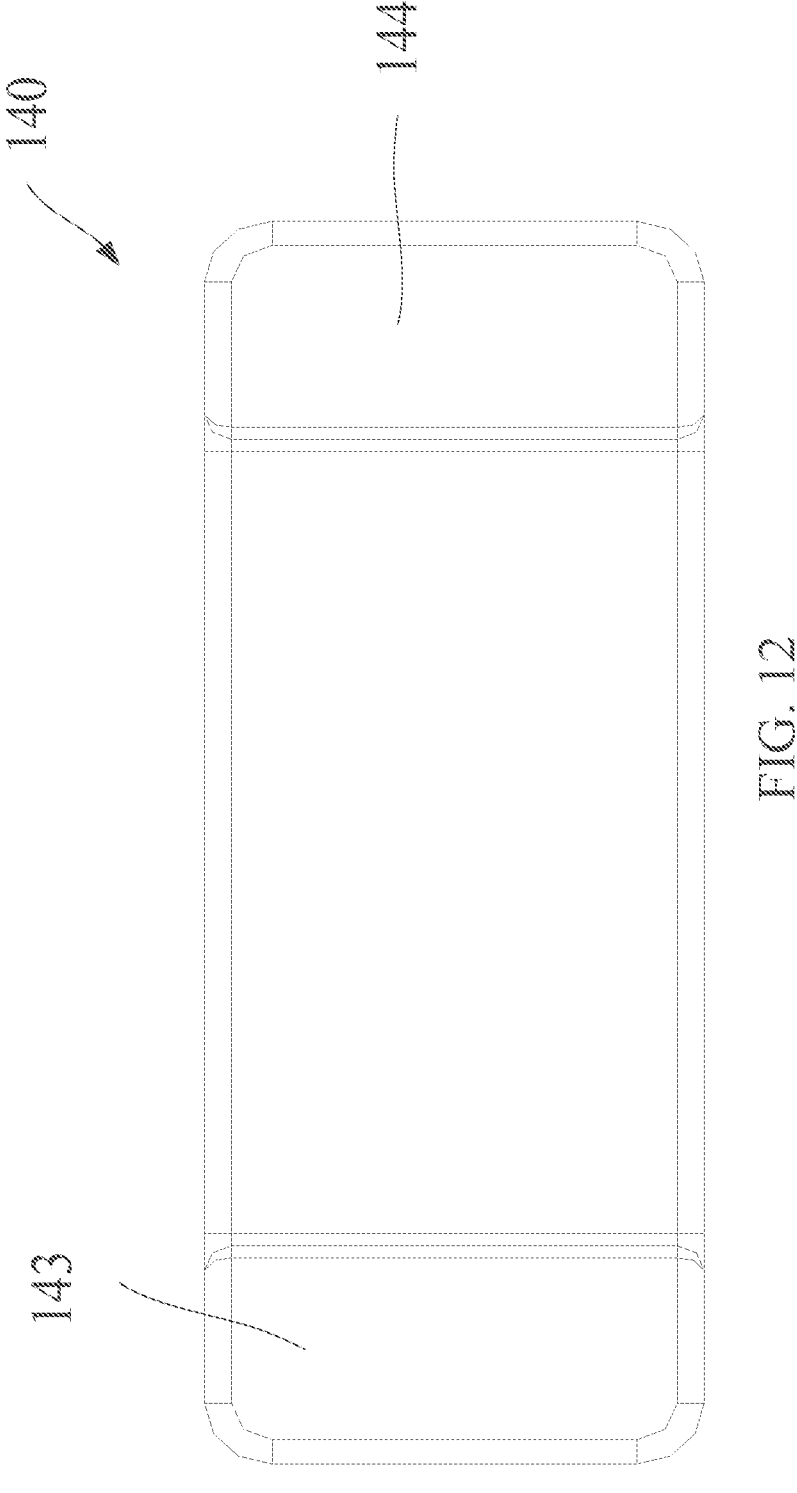
FIG. 12 is a second structural diagram of a second bracket according to an embodiment of this application.
Figure 13:
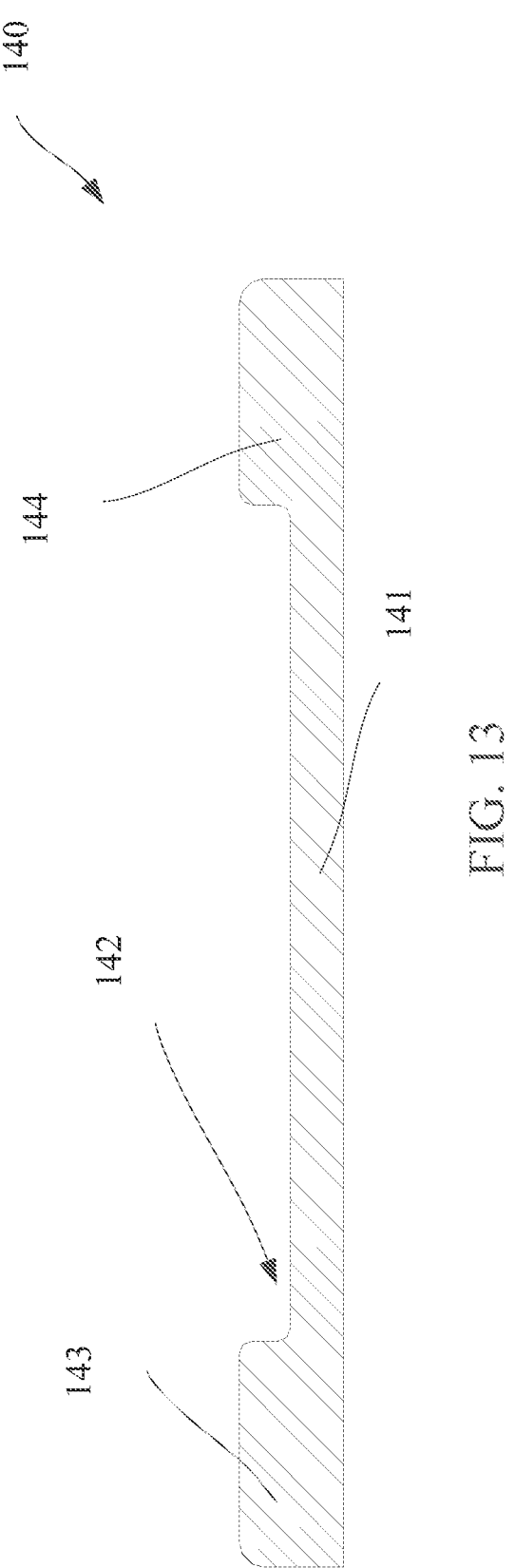
FIG. 13 is a third structural diagram of a second bracket according to an embodiment of this application.

FIG. 11 is a first structural diagram of a second bracket 140 according to an embodiment of this application. FIG. 12 is a second structural diagram of a second bracket 140 according to an embodiment of this application FIG. 13 is a third structural diagram of a second bracket 140 according to an embodiment of this application.

In some embodiments, as shown in FIG. 7, FIG. 9, FIG. 10, FIG. 11, FIG. 12, and FIG. 13, the second body 141 is provided with a concave groove 142. An opening of the concave groove 142 faces towards the first bracket 130, and the concave groove 142 is configured as the wire passing port.

In these embodiments, the wire passing port includes a concave groove 142. For example, an opening of the concave groove 142 faces towards the first bracket 130. It may be understood that the wire passing port may include a through hole extending in a direction in which the second flexible printed circuit 150 passes in or out. During an actual installation process of the circuit board component 100, if the wire passing port is configured as the concave groove 142 and the opening of the concave groove 142 faces upwards, a part of the second flexible printed circuit 150 can be directly installed on the concave groove 142. Compared with a solution in which the wire passing port includes a through hole, an installation process of the circuit board component 100 can further be simplified, so that installation efficiency can be improved and the circuit board component 100 is easy to disassemble and repair.

In some embodiments, as shown in FIG. 9 and FIG. 10, at least one second flexible printed circuit 150 is suspended in the air between the first bracket 130 and the second bracket 140.

In these embodiments, a part of the second flexible printed circuit 150 is suspended in the air between the first bracket 130 and the second bracket 140. That is, there is a given gap between a part of the second flexible printed circuit 150 and the first bracket 130, and there is also a given gap between a part of the second flexible printed circuit 150 and a groove wall of the concave groove 142 of the second bracket 140, so that after installation of the circuit board component 100 is completed, the part of the second flexible printed circuit 150 located between the first bracket 130 and the second bracket 140 still can move freely within a given degree. This avoids a situation that in a case that the circuit board component 100 is applied to electronic devices such as mobile phones, when the electronic devices such as the mobile phones drop, because the second flexible printed circuit 150 cannot move freely, the second flexible printed circuit 150 is pulled, thereby causing that wires on the second flexible printed circuit 150 break. In this way, reliability of the circuit board component 100 is improved and a service life of the electronic devices such as the mobile phones that are equipped with the circuit board component 100 is extended.

In some embodiments, the gap between the second flexible printed circuit 150 and the first bracket 130 and the gap between the second flexible printed circuit 150 and the groove wall of the concave groove 142 may be set according to an actual need.

In some embodiments, the wire passing port is provided in plurality, and the plurality of wire passing ports are spaced apart on the second body 141.

In this embodiment, the wire passing port is provided in plurality, and the plurality of wire passing ports are spaced apart on the second body 141. Each wire passing port can implement wiring on the second flexible printed circuit 150. The plurality of wire passing ports are spaced apart on the second body 141, thereby implementing wiring on a plurality of flexible printed circuits.

In some embodiments, if the wire passing port may be configured as the concave groove 142, a plurality of concave grooves 142 are spaced apart on the second body 141. In addition, as shown in FIG. 13, the second bracket 140 is in a shape of a long strip, and the plurality of concave grooves 142 may be spaced apart along a length direction of the second body 141. This can further reduce thickness of the circuit board component 100 in a Z-axis direction while wiring on a plurality of second flexible printed circuits 150 is implemented, thereby implementing ultra-thin design for electronic devices such as mobile phones.

Figure 14:
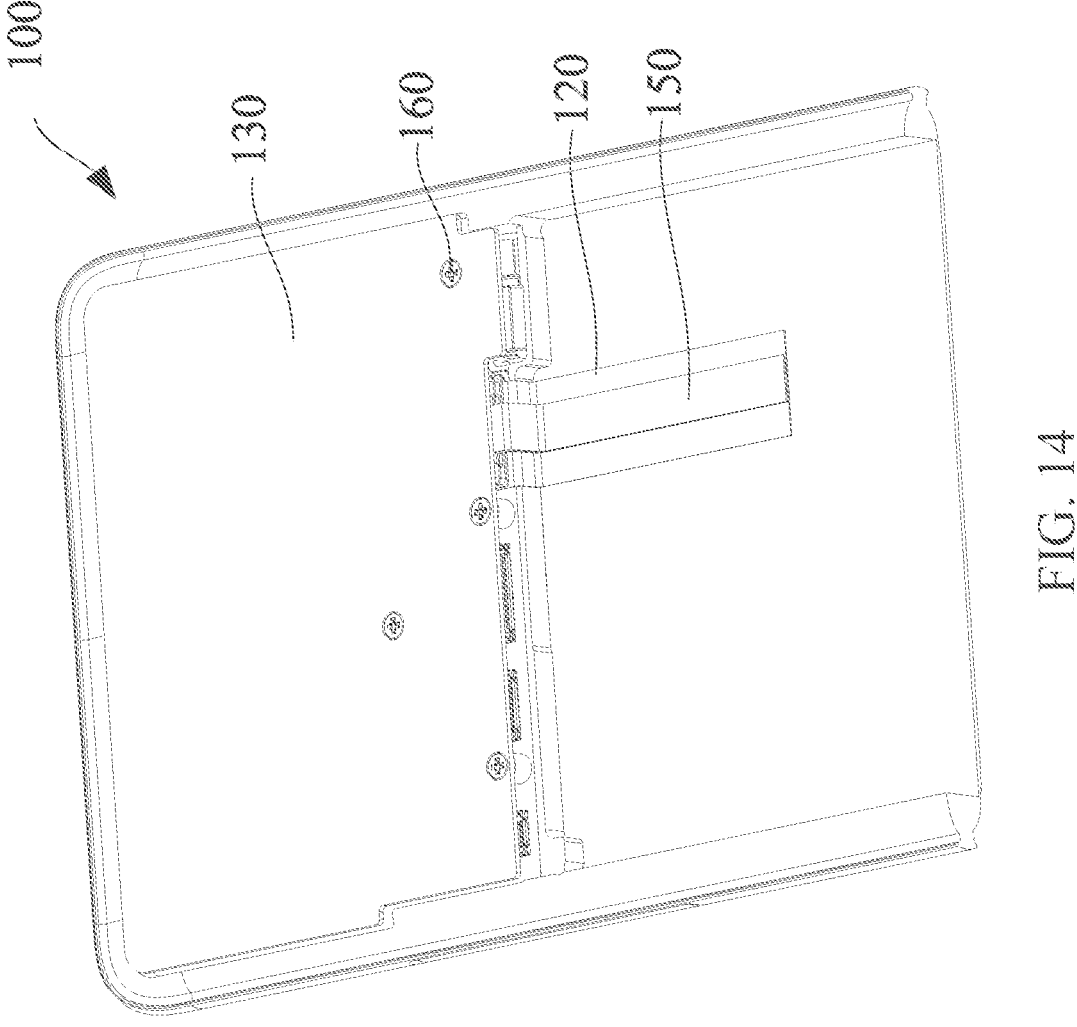
FIG. 14 is a fourth structural diagram of a circuit board component according to an embodiment of this application.
Figure 15:
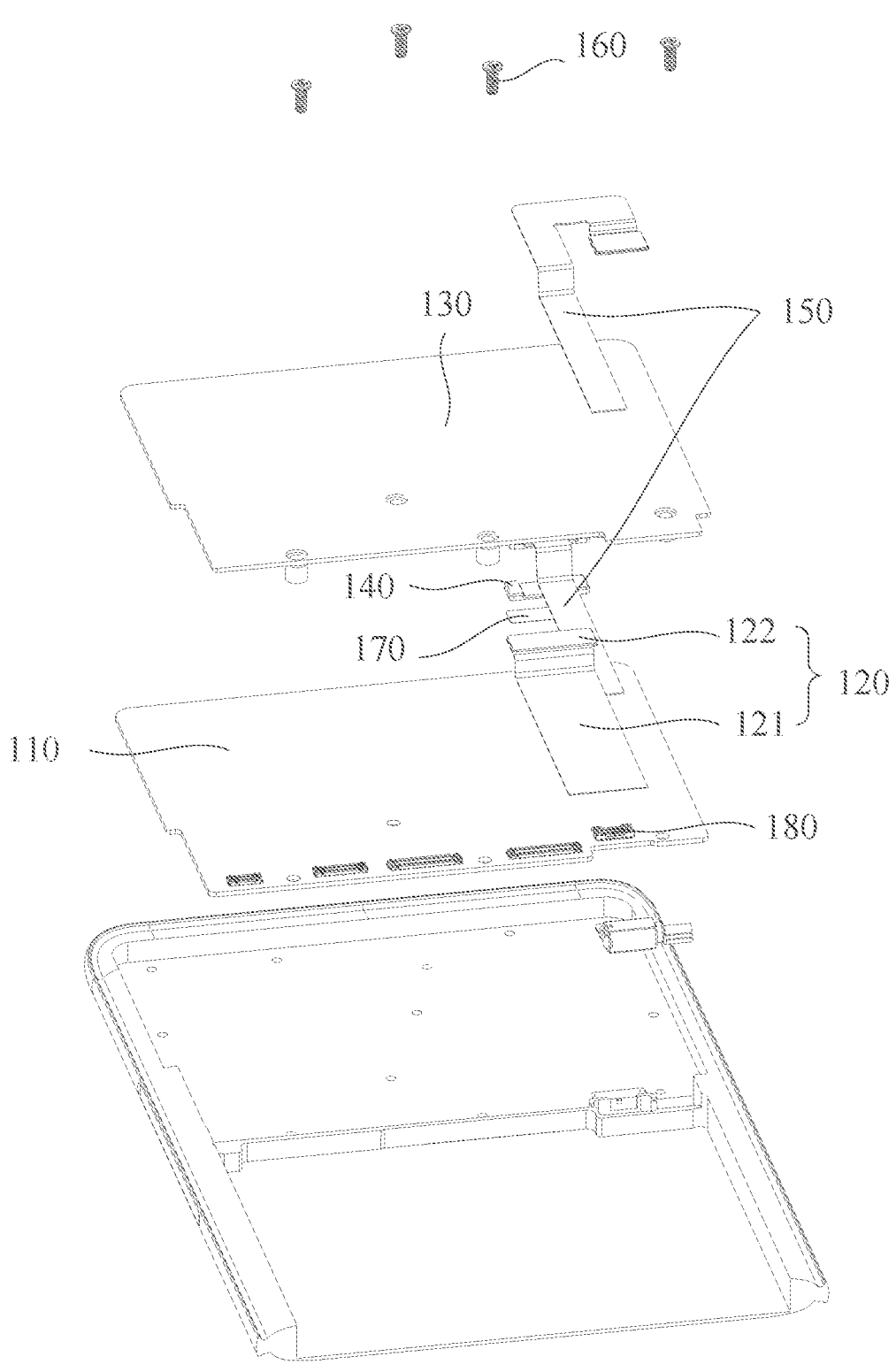
FIG. 15 is an exploded diagram of a circuit board component according to an embodiment of this application.
Figure 16:
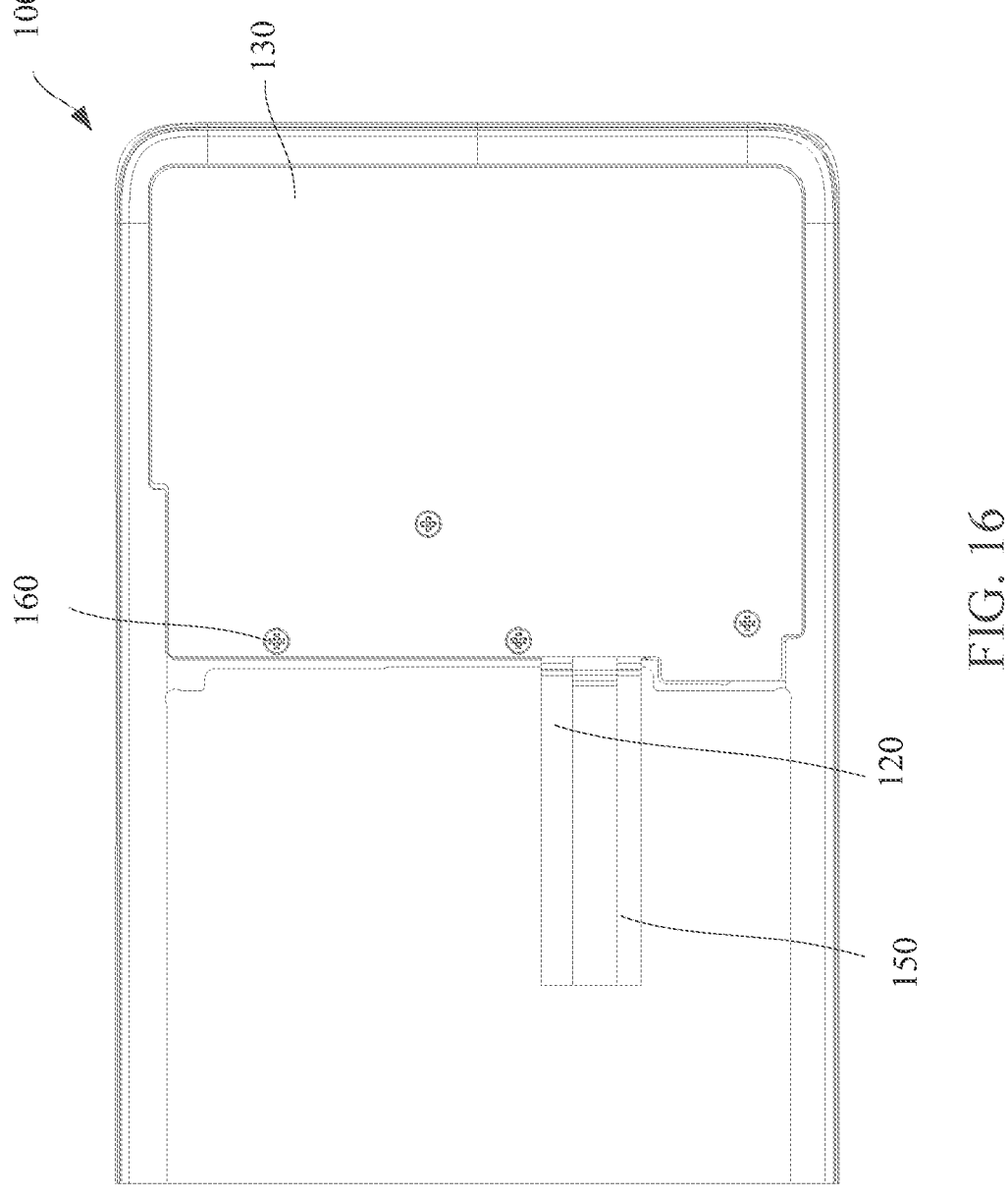
FIG. 16 is a fifth structural diagram of a circuit board component according to an embodiment of this application.
Figure 17:
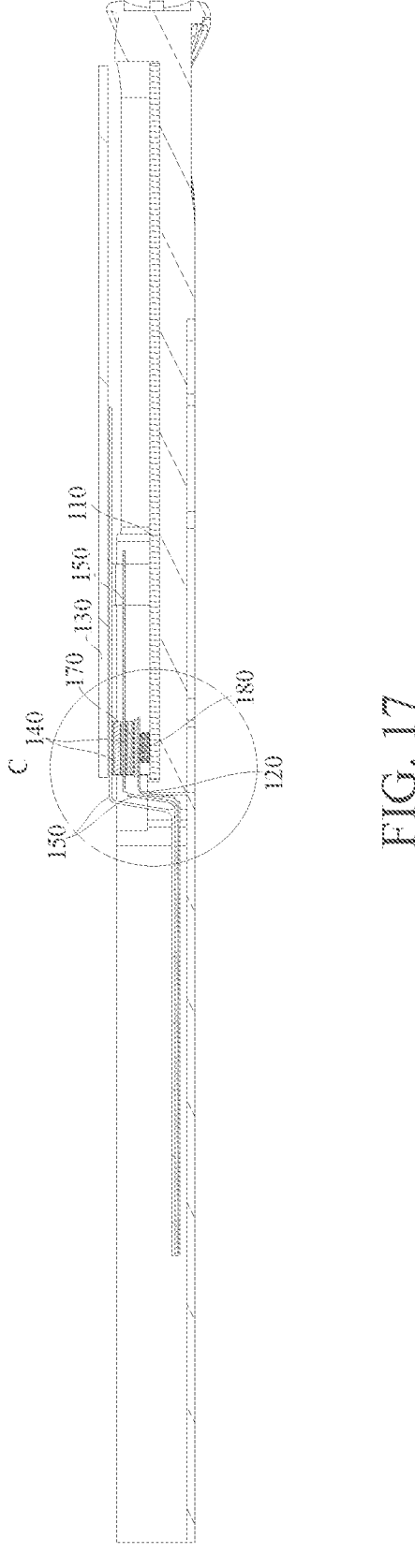
FIG. 17 is a sixth structural diagram of a circuit board component according to an embodiment of this application.
Figure 18:
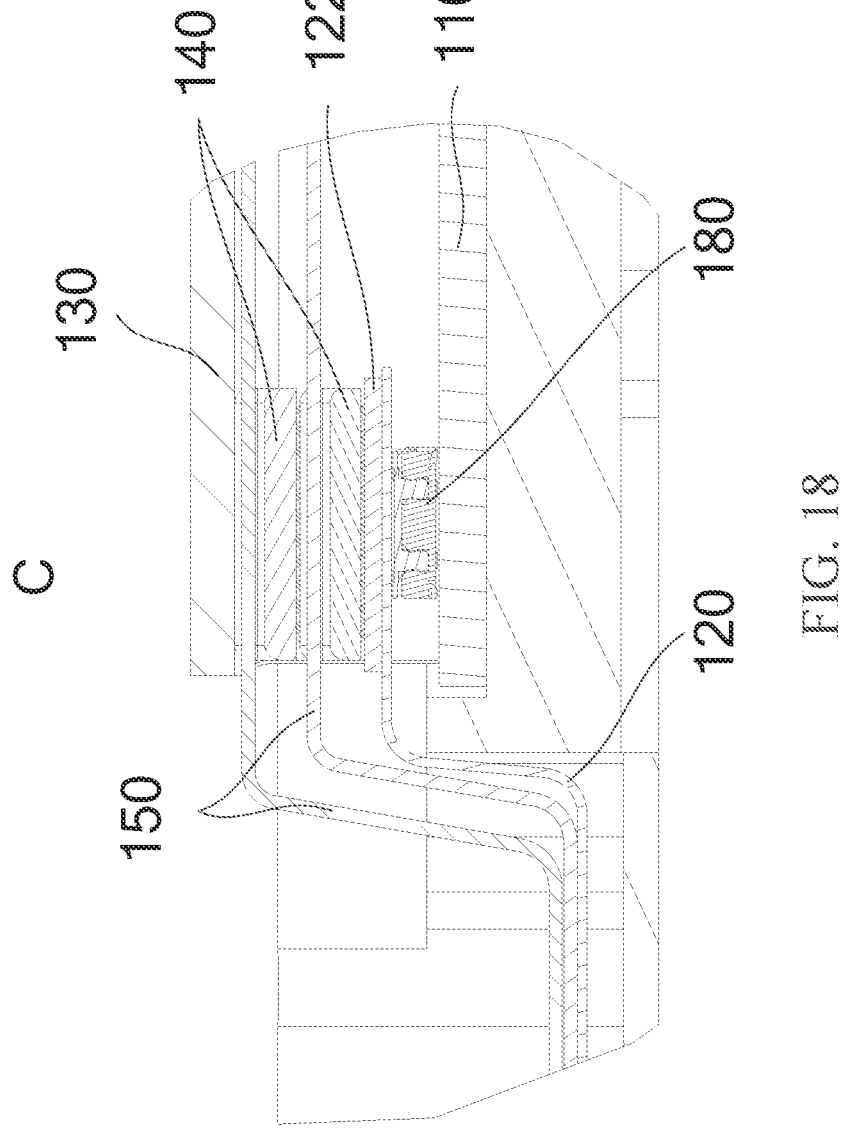
FIG. 18 is a partial view of the circuit board component shown in the embodiment in FIG. 17 enlarged at C.

FIG. 14 is a fourth structural diagram of a circuit board component 100 according to an embodiment of this application. FIG. 15 is an exploded diagram of a circuit board component 100 according to an embodiment of this application FIG. 16 is a fifth structural diagram of a circuit board component 100 according to an embodiment of this application. FIG. 17 is a sixth structural diagram of a circuit board component 100 according to an embodiment of this application. FIG. 18 is a partial view of the circuit board component 100 shown in the embodiment in FIG. 17 enlarged at C.

In another embodiment, as shown in FIG. 14, FIG. 15, FIG. 16, FIG. 17, and FIG. 18, the second flexible printed circuit 150 is provided in plurality, and a plurality of the second brackets 140 are in a one-to-one correspondence with the plurality of second flexible printed circuits 150. The plurality of second brackets 140 are stacked on each other, and each second flexible printed circuit 150 passes through the corresponding wire passing port.

In these embodiments, the second flexible printed circuit 150 is provided in plurality, and the second bracket 140 is also provided in plurality. In addition, a quantity of the second flexible printed circuits 150 are in one-to-one corresponds to a quantity of the second brackets 140, and the plurality of second brackets 140 are stacked on each other. It may be understood that each second bracket 140 includes at least one wire passing port, thereby implementing, by stacking the FPCs, wiring on a plurality of flexible printed circuits.

In some embodiments, as shown in FIG. 18, a plurality of the second brackets 140 may be stacked on each other along a height direction of the circuit board component 100. Except for the second bracket 140 that abuts against the first bracket 130 and the second bracket 140 that is connected to the first flexible printed circuit 120, a plurality of the second brackets 140 may abut against each other, so that by stacking the FPCs, wiring on a plurality of flexible printed circuits is implemented and when the first bracket 130 is fixedly connected to the main control board 110 by using the fastener 160, a plurality of the second brackets 140 can be pressed and fastened, thereby improving a fastening effect of the second bracket 140, effectively saving the fastener 160, and improving a space utilization rate of the circuit board component 100.

In some embodiments, as shown in FIG. 11, FIG. 12, and FIG. 13, the second bracket 140 further includes a first support table 143 and a second support table 144. The first support table 143 is disposed on a side of the second body 141 facing towards the first bracket 130. The second support table 144 is disposed on the side of the second body 141 facing towards the first bracket 130. The concave groove 142 is formed between the second support table 144 and the first support table 143. The first bracket 130 abuts against the first support table 143 and the second support table 144.

In these embodiments, the second bracket 140 further includes a first support table 143 and a second support table 144. For example, the first support table 143 and the second support table 144 are disposed on a side of the second body 141 facing towards the first bracket 130. The first support table 143 and the second support table 144 forms the concave groove 142. A part of the second flexible printed circuit 150 passes through the concave groove 142 to implement wiring. The first bracket 130 abuts against the first support table 143 and the second support table 144, so that when the first bracket 130 is connected and fastened to the main control board 110 by using the fastener 160, the first bracket 130 and the second bracket 140 are pressed and fastened, the second bracket 140 and the first flexible printed circuit 120 are pressed and fastened, and the first flexible printed circuit 120 and the main control board 110 are pressed and fastened, thereby implementing wiring on the flexible printed circuit. In addition, this further avoids a motherboard bracket and a PCB need to be fastened while a separate connector fastening bracket needs to be designed to press a BIB connector, and at least two additional screws need to be disposed to fasten the BTB connector fastening bracket, thereby causing complicated disassembly and low installation efficiency. That is, this can effectively save screws, and improve a space utilization rate of the circuit board component 100 and installation efficiency of the circuit board component 100.

In addition, compared with a solution in which the first bracket 130 is directly in connect with the second bracket 140, a solution in which the first bracket 130 is in contact with the first support table 143 and the second support table 144 can reduce a contact area between the first bracket 130 and the second bracket 140. Therefore, when the first bracket 130 is connected to the main control board 110, the first bracket 130 and the second bracket 140 are pressed tighter, the second bracket 140 and the first flexible printed circuit 120 are pressed tighter, the first flexible printed circuit 120 and the main control board 110 are pressed tighter, further improving reliability of the circuit board component 100.

In an embodiment, an area in which the first support table 143 abuts against the first bracket 130 is equal to an area in which the second support table 144 abuts against the first bracket 130.

In these embodiments, an area in which the first support table 143 abuts against the first bracket 130 is equal to an area in which the second support table 144 abuts against the first bracket 130. That is, when the first bracket 130 is fixedly connected to the main control board 110 by using the fastener 160, the first support table 143 and the second support table 144 receive a same account of a pressing force, so that the first bracket 130 and the second bracket 140 is subject to a balanced force, and the second bracket 140 and the first flexible printed circuit 120 is subject to a balance force, thereby extending a service life of the circuit board component 100.

In some embodiments, the circuit board component 100 further includes a connector 180. If a position in which the second bracket 140 abuts against the first bracket 130 is subjected to an unbalanced force, a position in which the first flexible printed circuit 120 is in connect with the connector 180 is subject to an unbalanced force. Therefore, during a process in which the circuit board component 100 drops, the connector 180 is prone to issues, for example, a pad cracks. The foregoing solution effectively extends a service life of electronic devices such as mobile phones that are equipped with the circuit board component 100.

In another embodiment, the first support table 143 and the second support table 144 are symmetrically disposed relative to the center of the second body 141.

In these embodiments, the first support table 143 and the second support table 144 are symmetrically disposed relative to the center of the second body 141. That is, when the first bracket 130 is fixedly connected to the main control board 110 by using the fastener 160, the first bracket 130 and the second bracket 140 may be subject to a balanced force, the second bracket 140 and the first flexible printed circuit 120 may be subject to a balanced force, thereby further extending a service life of the circuit board component 100.

In some embodiments, the first support table 143 and the second support table 144 are respectively disposed at two ends of the second body 141. This ensures that various positions between the first bracket 130 and the second bracket 140 and between the second bracket 140 and the first flexible printed circuit 120 are subject to a balanced force while as much as space is provided for installation of the second flexible printed circuit 150, so as to ensure gaps between the second flexible printed circuit 150 and a groove wall of the concave groove 142 and between the second flexible printed circuit 150 and the first bracket 130, further extending a service life of the circuit board component 100.

In some embodiments, as shown in FIG. 7, FIG. 9, FIG. 10, FIG. 15, FIG. 17, and FIG. 18, the first flexible printed circuit 120 includes a first body 121 and a reinforced member 122. The reinforced member 122 is disposed on a side of the first body 121 away from the main control board 110, and at least a part of the second bracket 140 is connected to the reinforced member 122.

In these embodiments, the first flexible printed circuit 120 includes a first body 121 and a reinforced member 122. For example, a reinforced member 122 is disposed on a side of the first body 121 away from the main control board 110. That is, a reinforced member 122 is disposed on a side of the first body 121 near the second bracket 140, and the second bracket 140 is disposed on the reinforced member 122, so that structural strength of connection positions between the first flexible printed circuit 120 and the connector 180 and between the first flexible printed circuit 120 and the second bracket 140 can be improved, thereby avoiding a situation in which the connector 180 is prone to issues, for example, a pad cracks during a process in which the circuit board component 100 drops. This effectively extends a service life of electronic devices such as mobile phones that are equipped with the circuit board component 100.

In some embodiments, the reinforced member 122 needs to be a thick, rigid, and high-strength stainless steel material. When the first bracket 130 is connected to the main control board 110, a force transferred from the first support table 143 and the second support table 144 on two sides of the second bracket 140 can be evenly distributed on the reinforced member 122. If stiffness and strength of the reinforced member 122 are low, during a process in which the circuit board component 100 drop, the connector 180 is prone to issues, for example, a pad cracks.

In some embodiments, as shown in FIG. 10 and FIG. 18, the circuit board component 100 further includes an adhesive member 170. The adhesive member 170 is disposed between the reinforced member 122 and the second bracket 140.

In these embodiments, the circuit board component 100 further includes an adhesive member 170. For example, the adhesive member 170 is disposed between the reinforced member 122 and the second bracket 140. That is, the second bracket 140 is glued to the reinforced member 122 by using the adhesive member 170, so that the second bracket 140 is further fastened, thereby improving stability and reliability of the circuit board component 100, further simplifying an installation process of the circuit board component 100, reducing installation difficulty of the circuit board component 100, and improving installation efficiency of the circuit board component 100.

In some embodiments, the adhesive member 170 includes a double-sided adhesive tape.

In some embodiments, as shown in FIG. 7, FIG. 10, FIG. 15, and FIG. 18, the main control board 110 is provided with a connector 180, and the first flexible printed circuit 120 is electrically connected to the main control board 110 by using the connector 180.

In these embodiments, the main control board 110 is provided with a connector 180, and the connector 180 is electrically connected to the main control board 110. The first flexible printed circuit 120 is electrically connected to the main control board 110 by using the connector 180, thereby implementing connection of each circuit on the circuit board component 100.

For example, during an installation process of the circuit board component 100, the first flexible printed circuit 120 is directly pressed to the connector 180. The reinforced member 122 is disposed on a side of the first body 121 away from the connector 180. The second bracket 140 is connected to the reinforced member 122 by using the adhesive member 170. The first bracket 130 abuts against the first support table 143 and the second support table 144 of the second bracket 140. A part of the second flexible printed circuit 150 passes through the concave groove 142 of the second bracket 140. The first bracket 130 is fixedly connected to the main control board 110 by using the fastener 160. Therefore, connection between the first flexible printed circuit 120 and the connector 180 is completed, thereby providing space for a layout of the circuit board component 100.

In addition, it is unnecessary to dispose the fastener 160 such as an additional screw to fasten the second bracket 140. In this way, by stacking the FPCs, wiring on the second flexible printed circuit 150 is implemented, and this avoids a motherboard bracket and a PCB need to be fastened while a separate connector fastening bracket needs to be designed to press a BTB connector, and at least two additional screws need to be disposed to fasten the BTB connector fastening bracket, thereby causing complicated disassembly and low installation efficiency. In the embodiments of this application, the first bracket 130 only needs to be connected to the main control board 110 by using the fastener 160, so that wiring on the second flexible printed circuit 150 is implemented, and the second flexible printed circuit 150 is pressed and fastened to the main control board 110 or the BTB connector, thereby effectively saving the fasteners 160, improving a space utilization rate of the circuit board component 100, and further improving installation efficiency.

Because the electronic device proposed in this embodiment has the circuit board component 100 according to any one of the foregoing embodiments, the electronic device has all the effects of the circuit board component 100 according to any one of the foregoing embodiments. Details are not described herein again.

In addition, the electronic device further includes a housing. The first bracket 130 is provided with a first connecting hole, the main control board 110 is provided with a second connecting hole, and the housing is provided with a third connecting hole. The fastener 160 can pass through the first connecting hole, the second connecting hole, and the third connecting hole separately to fasten the first bracket 130 and the main control board 110 to the housing, thereby implementing assembly of the circuit board component 100 and the electronic device.

It should be noted that in this application, unless otherwise specified, the term "a plurality of" means two or more. In addition, in the specification and the claims, "and/or" represents at least one of connected objects, and a character "/" generally represents an "or" relationship between associated objects. In this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In some embodiments, the technical solutions of this application entirely or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A circuit board component, comprising:
    a main control board;
    a first flexible printed circuit, wherein at least a part of the first flexible printed circuit is disposed on the main control board, wherein the main control board is provided with a connector, and the first flexible printed circuit is electrically connected to the main control board by using the connector;
    a first bracket, wherein the first flexible printed circuit is located between the first bracket and the main control board, and the first bracket is connected to the main control board;
    a second bracket, wherein at least a part of the second bracket is located between the first flexible printed circuit and the first bracket, the second bracket abuts against the first bracket, and the second bracket is connected to the first flexible printed circuit through a reinforced member;
    a second flexible printed circuit, wherein a part of the second flexible printed circuit is located between the first bracket and the second bracket,
    wherein the second bracket comprises:
        a second body, wherein at least a part of the second body abuts against the first bracket, and at least a part of the second body is connected to the first flexible printed circuit; and
        a wire passing port, wherein the wire passing port is provided on the second body, and the second flexible printed circuit passes through the wire passing port; and
    a fastener, wherein the first bracket is connected to the main control board by using the fastener.

2. The circuit board component according to claim 1, wherein:
    the second body is provided with a concave groove, an opening of the concave groove faces towards the first bracket, and the concave groove is configured as the wire passing port.

3. The circuit board component according to claim 2, wherein the second bracket further comprises:
    a first support table, disposed on a side of the second body facing towards the first bracket; and
    a second support table, disposed on the side of the second body facing towards the first bracket, wherein the concave groove is formed between the second support table and the first support table, wherein
    the first bracket abuts against the first support table and the second support table.

4. The circuit board component according to claim 3, wherein
    an area in which the first support table abuts against the first bracket is equal to an area in which the second support table abuts against the first bracket.

5. The circuit board component according to claim 1, wherein
    the wire passing port is provided in plurality, and the plurality of wire passing ports are spaced apart on the second body.

6. The circuit board component according to claim 1, wherein:
    the second flexible printed circuit is provided in plurality, and a plurality of the second brackets are in a one-to-one correspondence with the plurality of second flexible printed circuits; and the plurality of second brackets are stacked on each other, and each second flexible printed circuit passes through the corresponding wire passing port.

7. The circuit board component according to claim 1, wherein the first flexible printed circuit comprises:

a first body; and the reinforced member, disposed on a side of the first body away from the main control board, wherein the at least a part of the second bracket is connected to the reinforced member.

8. An electronic device, comprising a circuit board component, comprising:

a main control board;

a first flexible printed circuit, wherein at least a part of the first flexible printed circuit is disposed on the main control board, wherein the main control board is provided with a connector, and the first flexible printed circuit is electrically connected to the main control board by using the connector;

a first bracket, wherein the first flexible printed circuit is located between the first bracket and the main control board, and the first bracket is connected to the main control board;

a second bracket, wherein at least a part of the second bracket is located between the first flexible printed circuit and the first bracket, the second bracket abuts against the first bracket, and the second bracket is connected to the first flexible printed circuit through a reinforced member;

a second flexible printed circuit, wherein a part of the second flexible printed circuit is located between the first bracket and the second bracket, wherein the second bracket comprises:

a second body, wherein at least a part of the second body abuts against the first bracket, and at least a part of the second body is connected to the first flexible printed circuit; and a wire passing port, wherein the wire passing port is provided on the second body, and the second flexible printed circuit passes through the wire passing port; and a fastener, wherein the first bracket is connected to the main control board by using the fastener.

9. The electronic device according to claim 8, wherein:

the second body is provided with a concave groove, an opening of the concave groove faces towards the first bracket, and the concave groove is configured as the wire passing port.

10. The electronic device according to claim 9, wherein the second bracket further comprises:

a first support table, disposed on a side of the second body facing towards the first bracket; and a second support table, disposed on the side of the second body facing towards the first bracket, wherein the concave groove is formed between the second support table and the first support table, wherein the first bracket abuts against the first support table and the second support table.

11. The electronic device according to claim 10, wherein an area in which the first support table abuts against the first bracket is equal to an area in which the second support table abuts against the first bracket.

12. The electronic device according to claim 8, wherein the wire passing port is provided in plurality, and the plurality of wire passing ports are spaced apart on the second body.

13. The electronic device according to claim 8, wherein:

the second flexible printed circuit is provided in plurality, and a plurality of the second brackets are in a one-to-one correspondence with the plurality of second flexible printed circuits; and the plurality of second brackets are stacked on each other, and each second flexible printed circuit passes through the corresponding wire passing port.

14. The electronic device according to claim 8, wherein the first flexible printed circuit comprises:

a first body; and the reinforced member, disposed on a side of the first body away from the main control board, wherein the at least a part of the second bracket is connected to the reinforced member.

* * * * *